United States Patent [19]
Billaud et al.

[11] Patent Number: 5,317,317
[45] Date of Patent: May 31, 1994

[54] METHOD AND DEVICE TO DETECT THE GARBLING OF PULSES RECEIVED BY A SECONDARY RADAR BY PHASE ANALYSIS

[75] Inventors: Philippe Billaud, Fontenay Aux Roses; Claude de Volder, Auffargis, both of France

[73] Assignee: Thomson-CSF, Puteaux, France

[21] Appl. No.: 29,169

[22] Filed: Mar. 10, 1993

[30] Foreign Application Priority Data

Mar. 10, 1992 [FR] France ............... 92 02844

[51] Int. Cl.⁵ .................. G01S 13/76; G01S 13/44
[52] U.S. Cl. .......................... 342/40; 342/149
[58] Field of Search ................ 342/40.37, 149

[56] References Cited

U.S. PATENT DOCUMENTS

| | | | |
|---|---|---|---|
| 3,728,730 | 4/1973 | Takao et al. | 342/149 |
| 4,334,224 | 6/1982 | Gordon | 342/40 |
| 5,072,224 | 12/1991 | Verbeke et al. | 342/152 |
| 5,220,329 | 6/1993 | Verbeke, Jr. et al. | 342/40 |

Primary Examiner—Gilberto Barrón, Jr.
Attorney, Agent, or Firm—Oblon, Spivak, McClelland, Maier & Neustadt

[57] ABSTRACT

Disclosed are a method and a device to detect the intermingling, hence the garbling, of pulses received by a secondary radar by phase analysis. The monopulse reception antenna of a secondary radar delivering a sum signal given by its sum channel and a difference signal given by its difference channel, the method according to the invention consists in analyzing the phase difference between the sum signal and the difference signal, the garbling of at least two received pulses being detected by a phase difference with a value that is substantially different from 0° or 180°. Application to the detection of garbled pulses received when the working frequencies of the transponders are very close to one another.

9 Claims, 4 Drawing Sheets

METHOD AND DEVICE TO DETECT THE GARBLING OF PULSES RECEIVED BY A SECONDARY RADAR BY PHASE ANALYSIS

BACKGROUND OF THE INVENTION

1. Field of the Invention

The present invention relates to a method and a device for the detection, by phase analysis, of the garbling of pulses received by a secondary radar. It can be applied notably to secondary radars receiving pulse responses from several aircraft at a time, and can be applied especially when the working frequencies of their transponders are very close to one another.

With air traffic becoming increasingly dense, the pulses sent out by the transponders of aircraft towards secondary radars on the ground get jumbled, creating phenomena of pulse-garbling. This garbling induces false codes in the reception and processing circuits of the secondary radars, which prevents the identifying of the aircraft or of their positions, and thereby leads to serious consequences for air traffic safety.

The presence of a pulse of a secondary response sent out by an aircraft is generally detected by means of a signal referenced $Q\Sigma$, the amplitude of which is half that of the signal received by the sum channel of the antenna of the secondary radar. The processing of the secondary radar makes use of this type of information only, firstly in order to detect a response, especially the two known and standardized pulses F1 and F2 which are separated by 20.3 $\mu$s and sandwich the response and, secondly, to detect the code of the response having the shape of a sequence of pulses. Consequently, all the secondary processing uses only the presence of high frequency power contained in pulses with a standardized duration equal to 450 ns separated from one another by a standardized spacing that is a multiple of 1.45 $\mu$s. Each pulse conveys a binary information element. Consequently, if its power goes beyond a certain threshold which is a function of the reference pulses F1 or F2, this information will be equal, for example, to 1. If not, it will be equal to 0. The power sent out by the transponders of the aircraft is generally transposed, at reception, into the range of the so-called intermediate frequencies, typically of the order of 60 MHz, and then detected through logarithmic limiter amplifiers aimed notably at absorbing the high dynamic range of power received and at preventing, for example, the saturation of the processing circuits.

In the event of garbling between two pulses received by a secondary radar, the prior art methods of analysis, notably the systems used to analyze the power of the signal $Q\Sigma$, do not reveal the existence of two intermingled (hence garbled) pulses when the difference in power between these pulses is below 6 dB for example, i.e. when the power of one of them is not at least equal to twice that of the other one. Errors of detection are then made in the duration and position of the two garbled pulses.

There are existing approaches that can be used to resolve these problems. In particular it is possible, should the reception antenna of the secondary radar be of the monopulse type, to make use of power and difference measurement signals coming from the sum and difference channels. The power signal is, for example, the logarithmic expression of the signal coming from the sum channel. This signal may be referenced Log $\Sigma(t)$. The difference measurement signal is the ratio of the signal of the difference channel to the signal of the sum channel, it may be referenced $\Delta/\Sigma(t)$. These approaches analyze the shape of the signals Log $\Sigma(t)$ and $\Delta/\Sigma(t)$. These are pulsed signals, and are synchronous with the received pulses. According to these approaches, if there are ripples that are superimposed on the signals Log $\Sigma(t)$ and $\Delta/\Sigma(t)$ and that go beyond a certain threshold, then the presence of garbling is deduced. These ripples are actually due to the variations in operating frequency between the different transponders sending their responses out towards the secondary radar. Now, if these variations are too small, then these ripples cannot be detected. Typically, such a variation should be greater than about 1 MHz. However, the modern digital transponders, which are based on quartz oscillators with a precision of less than $\pm 10^{-5}$ work with frequencies that are increasingly close to each other and do not allow these approaches to be used. Indeed, if the ripples due to garbling are at a frequency of the order of 20 kHz, which may be the case with these modern transponders, with the received pulses lasting 450 ns and the period of the ripples lasting 50 $\mu$s, then it will be impossible to detect any variation in level or in variation measurement within the received pulse.

SUMMARY OF THE INVENTION

The aim of the invention is to overcome the above-mentioned drawbacks, notably by enabling the detection of "garbling" due to transponders with operating frequencies that are very close to one other.

To this effect, an object of the invention is a method to detect the garbling of pulses received by a secondary radar with monopulse reception antenna delivering a sum signal given by its sum channel and a difference signal given by its difference channel, wherein said method consists in analyzing the phase difference between the sum signal and the difference signal, the garbling of at least two received pulses being detected by means of a phase difference, the value of which is substantially different from 0° or 180°.

Another object of the invention is a device for the implementation of the above-mentioned method.

The main advantages of the invention are that it is simple to implement and economical.

BRIEF DESCRIPTION OF THE DRAWINGS

Other features and advantages of the invention will appear from the following description, made with reference to the appended drawings, of which.

DESCRIPTION OF THE INVENTION

Figure 1A:
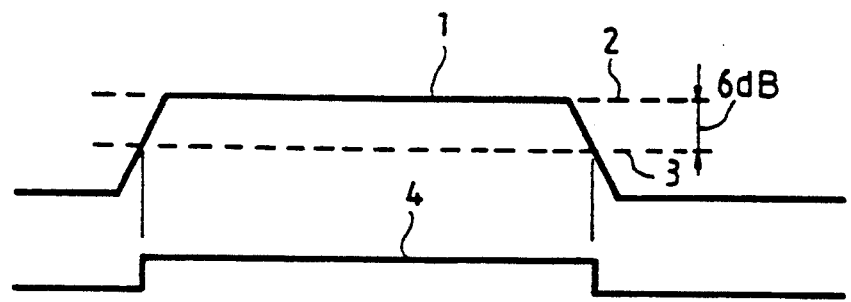
FIG. 1a shows a standard received pulse.

FIG. 1a represents the power level of a standard pulse 1 received by reception circuits, notably by the sum channel of the monopulse antenna of a secondary radar. Straight lines 2, 3 demarcate half of the power contained in the pulse 1. Expressed in terms of logarithmic data, the power level defined by the lower straight line 3 is reduced by 6 dB with respect to the maximum level of power defined by the upper straight line 2. The curve 4, generally referenced QΣ, represents a signal for the detection of an amplitude half that of the received pulse 1, i.e. the maximum power minus 6 dB.

Figure 1B:
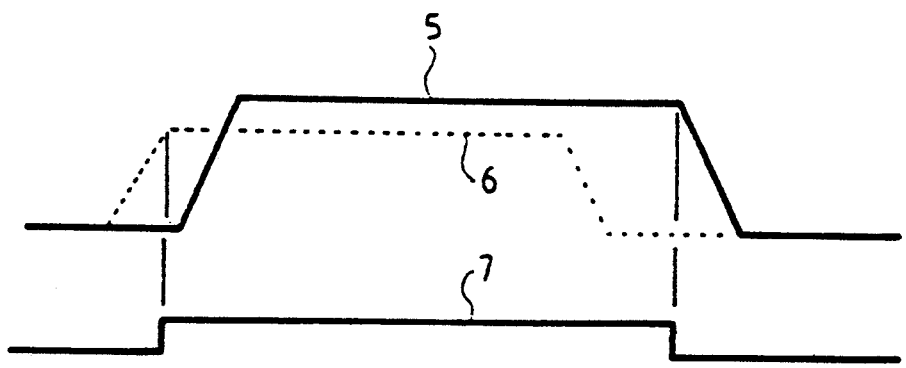
FIG. 1b shows the intermingling, hence garbling, of two received pulses.

FIG. 1b shows an example of garbling where two pulses 5, 6, transmitted for example by two different aircraft, get intermingled, hence garbled, to form a composite signal at the input of the reception circuits of a secondary radar. If the difference in power between the two pulses 5, 6 is below 6 dB for example, the signal 7 detecting the half power of the received signals does not differentiate these two pulses 5, 6.

The reception antennas used in the secondary radars are generally monopulse antennas and therefore contain a sum channel and a difference channel. The sum channel is essentially used to receive the power of the signal transmitted by the transponder of an aircraft and hence to detect the response and the code contained in this signal. The difference channel is used with the sum channel to form a voltage, which is the ratio of the signal received by the difference channel to the signal received by the sum channel, related to the off-alignment of the aircraft with respect to the axis of the antenna of the secondary radar. This voltage is therefore used to determined the azimuth of the target with precision.

Figure 2:
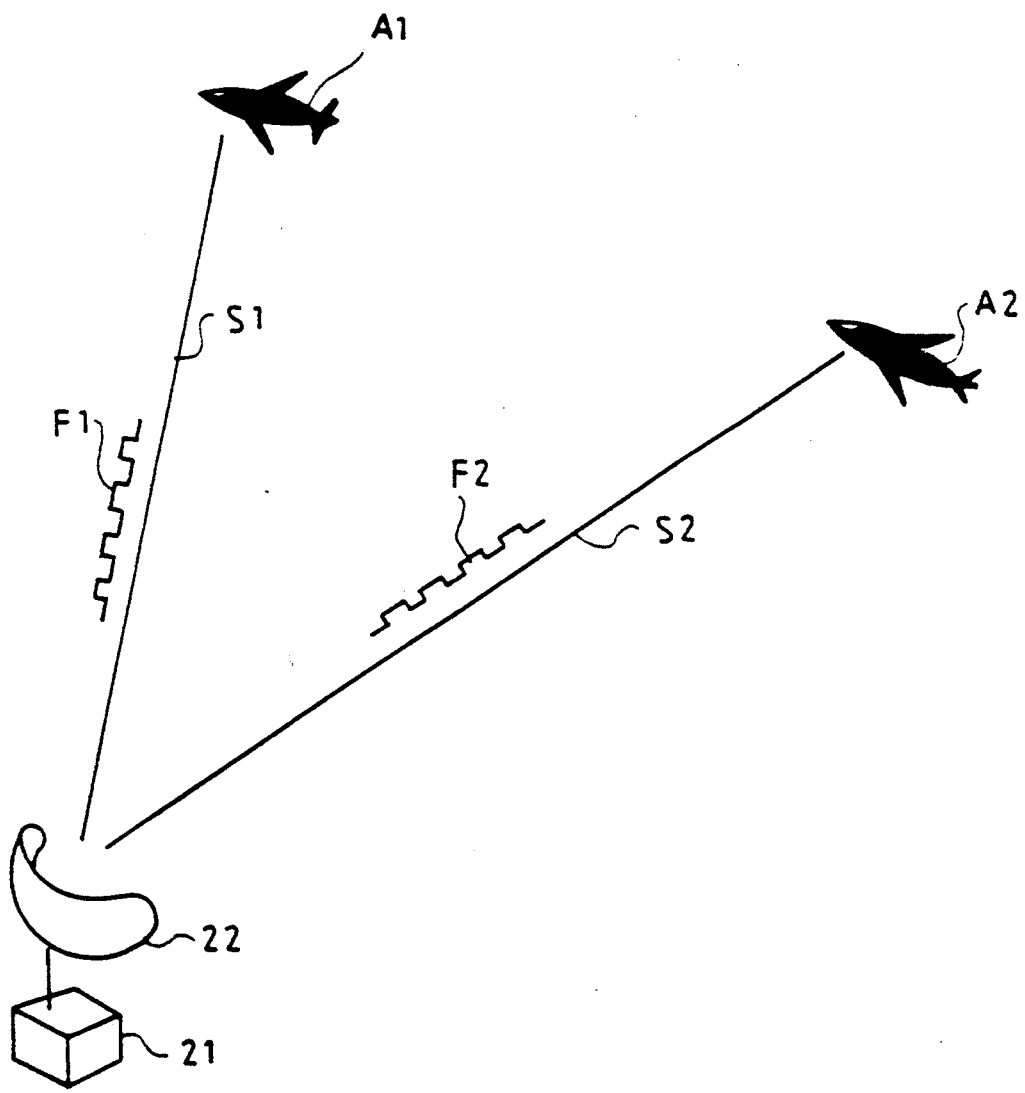
FIG. 2 shows an example where two transponders send out response signals towards one and the same radar.

FIG. 2 shows a case where the transponders of two aircraft A1, A2 send response signals S1, S2 towards the antenna 22 of a radar 21. The aircraft A1 gives, for example, the signal S1 with a power P1, a frequency F1 and a phase Φ1, and similarly the aircraft A2 gives the signal S2 with a power P2, a frequency F2 and a phase Φ2.

The frequencies F1, F2 are in a band centered on the frequency of 1090 MHz. At the reception circuits of the secondary radar, these frequencies are transposed to the range of frequencies known as intermediate frequencies, for example 60 MHz.

Furthermore, the signals received by the secondary radar generate a sum signal referenced Σ in the sum channel of the reception antenna 22 and a difference signal referenced Δ in its difference channel.

Figure 3:
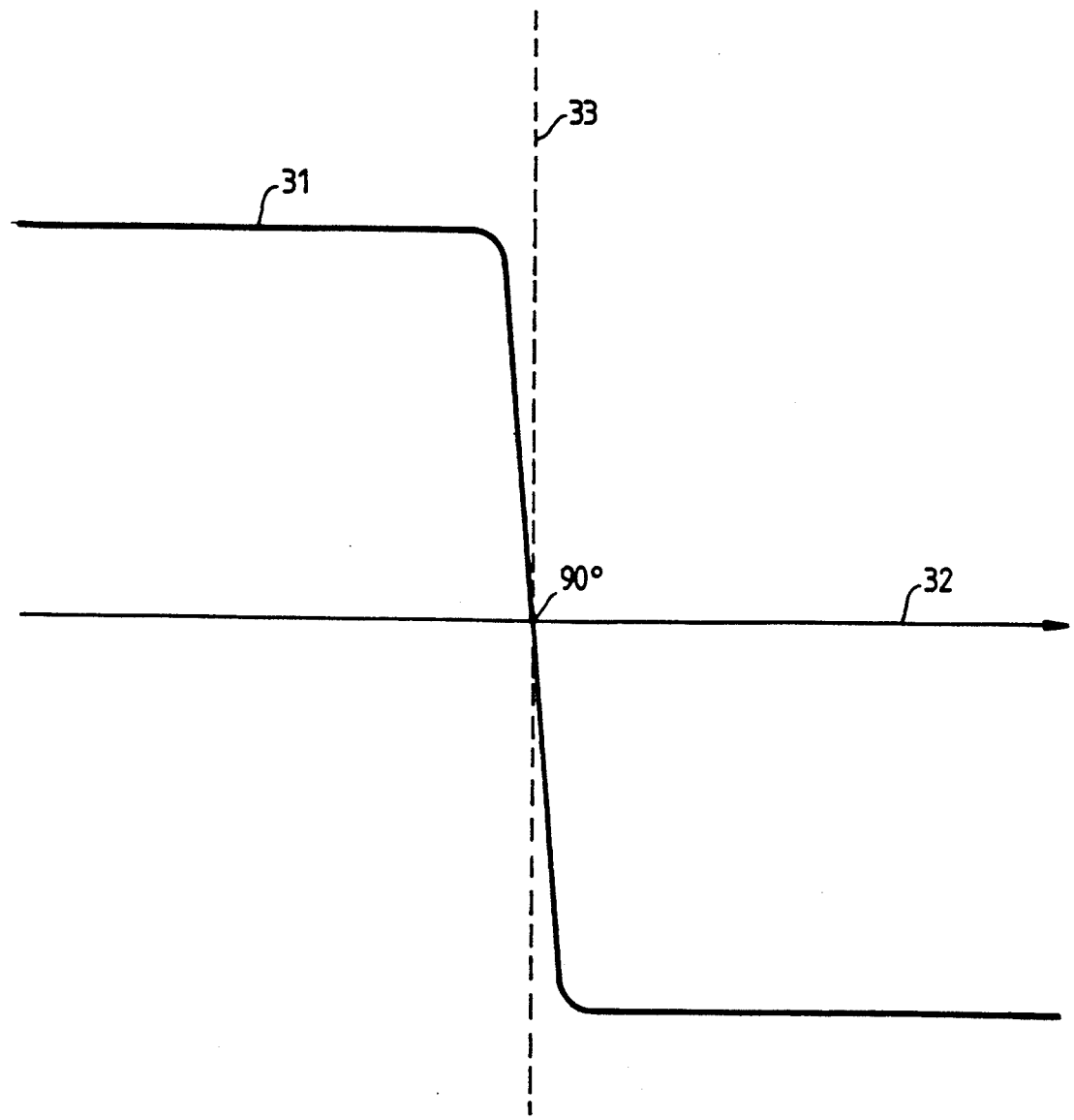
FIG. 3 shows a curve representing the general shape of the phase-shift between the signals coming from the sum and difference signals of the reception antenna.

FIG. 3 shows the general shape of the curve 31 representing the phase-shift between the sum signal Σ and the difference signal Δ in the presence of only one received signal, the axis 32 defining the azimuth of the received signal and the axis 33 defining the above-mentioned phase-shift. Outside the vicinity of a point defining the position of the central axis of the antenna, the phase-shift between the sum signal Σ and the difference signal Δ is constant. It is equal to 0° or 180°. The above-mentioned vicinity around the central axis of the antenna is generally defined by an angle of some tenths of a degree approximately.

In the event of garbling, when two received pulses are intermingled, the computations and the experiments performed by the Applicant have shown that the phase-shift of the sum signal Σ with respect to the difference signal Δ is no longer equal to 0° or 180°, provided that the two intermingled, hence garbled, signals are not substantially in phase, this case being, all the same, statistically rare. Thus, according to the invention, one way to detect the presence of garbling consists in analyzing the phase differences between the sum signal Σ and the difference signal Δ. If the phase difference is theoretically different from 0° or 180°, the result thereof is the presence of two garbled pulses. In reality, when there is no garbling, the phase difference is not exactly equal to 0° or 180°, hence a garbling will be detected for a phase difference substantially different from 0° or 180°. However, as can be seen in FIG. 3, the phase difference is poorly defined about the 0° point, i.e. for signals whose azimuth is located in the central axis of the reception antenna where this phase difference changes over from 0 to 180°. This, in this case, prevents the use of this phase difference to detect garblings.

According to the invention, when the received signals have an azimuth located in the vicinity of the central axis of the antenna, one means of detecting the presence of garbling then consists in analyzing the frequency variations between the sum signal Σ and the difference signal Δ. In the latter case, the sum signal Σ has a power level that is very appreciably higher than that of the difference signal Δ. It is therefore possible, when the difference in power between the sum signal Σ and the difference signal Δ exceeds a certain threshold, equal to 15 dB for example, to decide on a change from phase analysis to frequency analysis. In this case, if a single pulse is received by the secondary radar, the frequency variation between the sum signal Σ and the difference signal Δ remains substantially zero. In the event of the reception of two garbled pulses having different frequencies, there are variations of frequencies in the sum signal Σ and in the difference signal Δ due to the differences in the frequencies of the signals. Consequently, the variation in frequency between the sum signal Σ and difference signal Δ no longer remains constant and departs from the above-mentioned range. This frequency analysis is no longer possible unless the frequency variation between the received pulses is not too small, below about 1 MHz for example. Indeed, the smaller this variation becomes, the greater is the extent to which the present means for detecting the variation in the frequency variation between the sum signal Σ and the difference signal Δ become inoperative, whence the use of phase analysis when this is possible, i.e. outside the neighborhood of the central axis of the antenna. The method according to the invention can therefore be used to detect garbling when the received garbled pulses have azimuths located outside the vicinity of the central axis of the reception antenna of the secondary radar or when their frequency variation is sufficiently high, greater than 1 MHz for example. Only cases of the garbling of signals located in this vicinity and having a frequency variation below a given threshold, of 1 MHz for example, cannot be detected. Since the above-mentioned vicinity is generally defined by an angle of some tenths of a degree, the efficiency of the method according to the invention is very conclusively proved. For reasons of economy, it is possible for example to retain only the phase analysis, the results obtained being still statistically satisfactory.

To make the method according to the invention relatively independent of the power values received, the sum signal Σ and the difference signal Δ may be, for example, limited in power.

As the case may be, a single signal, the sum signal Σ or the difference signal Δ, are enough to detect the presence of a garbling. Indeed, in the case of garbling, frequency variations appear inside the sum signal Σ and the difference signal Δ. This variation is therefore theoretically sufficient for the detection of a garbling. Nonetheless the transponders, notably magnetron transponders, are not always stable and are themselves the cause of frequency variations inside their transmitted pulses which are recovered in the sum signal Σ and difference signal Δ. The value of the above method proposed by the invention, as regards frequency analysis, is that it can be used to get rid of the frequency variations caused by transponders since it plays on the variation, hence the difference, between the frequency of the sum signal Σ and the frequency of the difference signal Δ, this variation or this difference being independent of the variations in the frequencies of the transponders.

Figure 4:
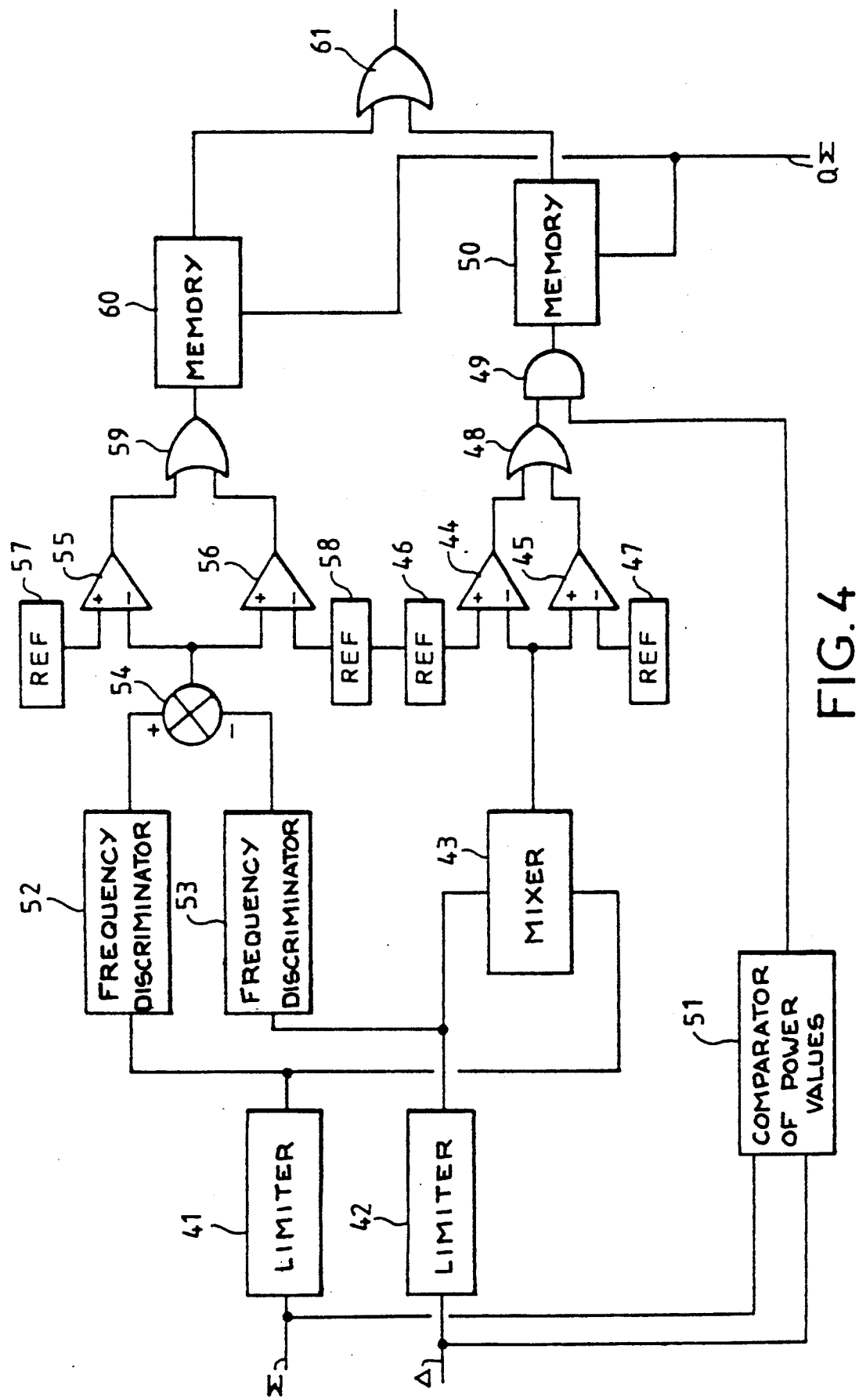
FIG. 4 shows a block diagram of a possible embodiment for the implementation of the method according to the invention.

FIG. 4 shows the block diagram of a possible embodiment for the implementation of the method according to the invention.

After the transposition to intermediate frequency, the sum signal Σ enters the input of a first power limiter 41 and an input of a power comparator 51 while the difference signal Δ enters the input of a second power limiter 42 and the other input of the power comparator. The sum signal Δ and difference signal Δ are transposed, for example, to the range of the intermediate frequencies. The power limiters 41, 42 make the downline circuits independent of the power values brought into play. Only the frequencies and the phases are analyzed. The output of the first limiter 41 is connected to an input of a mixer 43 and the output of the second limiter 42 is connected to the other input of the mixer 43. At its output, the mixer 43 has a voltage that is practically linear as a function of the phase-shift between its input signals, i.e. between the sum signal Σ and the difference signal Δ. The output of the mixer 43 is connected to the negative input of a first comparator 44 and to the positive input of a second comparator 45. The positive input of the first comparator 44 is coupled to a first voltage reference 46 and the negative input of the second comparator 45 is coupled to a second reference voltage 47. The first reference 46 is used for example to set up a threshold that makes it possible to detect the fact that the phase-shift at the entry of the mixer 43 is substantially equal to 0°, the reference 46 delivering for example a voltage corresponding to a 0 phase-shift diminished by 10° or 20° approximately. Similarly, the second reference 47 is used, for example, to make a threshold that makes it possible to detect the fact that the phase-shift at input of the mixer 43 is substantially equal to 180°, the reference 47 delivering, for example, a voltage corresponding to a 180° phase-shift plus about 10° or 20°. According to the invention, in the event of garbling, the phase-shift at the input of the mixer being substantially different from 0° or 180°, this is expressed in the device of FIG. 4 by a change to a high level at output of the comparators 44 and 45. These outputs are therefore connected to the two inputs of a first "OR" logic port. It is of course possible to reverse this logic, i.e. to choose a configuration such that a garbling is expressed by a low level at output of the comparators, the "OR" gate 48 being then replaced by and "AND" gate. The comparators 44, 45, the voltage references 46, 47 and the "OR" gate 48 constitute these first comparison means. Other circuits could constitute these first comparison means. The output of these first comparison means, the output of the "OR" gate in the exemplary embodiment of FIG. 4, is connected to an input of an AND logic gate 49, the other input of this AND gate 49 being connected to the output of the power comparator 51. Indeed, when the power of the sum signal Σ is appreciably higher than that of the difference signal Δ, this means that the received signal has an azimuth located in the main vicinity of the antenna and hence that the phase-shift between the sum signal Σ and the difference signal is undefined as can be seen in FIG. 3, i.e. that it can take any value between −90° and +90°. Under these conditions it is possible, for example, to inhibit the result of the first comparison means 44, 45, 46, 47, 48 by means of the AND logic gate 49 and the power comparator 51. Should the power of the sum signal Σ be appreciably higher than that of the difference signal Δ, the output of the power comparator goes, for example, to a low level, thus inhibiting the output of the OR logic gate 48. The triggering threshold of the power comparator 51 may be fixed, for example, at about 15 dB. The output of the AND logic gate 49, conditioned by the results of the first comparison means 44, 45, 46, 47, 48 and of the power comparator 51, is connected to the input of a first memory 50. This memory 50 is, for example, validated by the above-mentioned signal QΣ which is used to detect the presence of received pulses. To this effect, the signal QΣ is, for example, connected to the control input of the memory 50. The memory 50 is used, for example, to memorize the appearance of a high level at output of the logic gate 49 signifying the presence of a garbling during the pulse.

In the device of FIG. 4 for implementing the invention, the phase analysis is complemented by a frequency analysis, the main role of which is to detect garbling when the phase analysis is inhibited by the power comparator 51. To this effect, the output of the first power limiter 41 is connected to the input of a first frequency discriminator 52, the output of which is connected to the positive input of a subtractor circuit 54. Similarly, the output of the second power limiter 42 is connected to the input of a second frequency discriminator 53, the output of which is connected to the negative input of the subtractor circuit 54. The outputs of the frequency discriminators 52, 53 each deliver a voltage that is linearly a function of frequency of its input signal. The subtractor circuit 54 presents the difference between these voltages at its output. When there is no garbling, this difference remains substantially zero. To detect the passing of this voltage outside this range, i.e. to detect the presence of a case of garbling, the output of the subtractor circuit 54 is connected to second comparison means. To this end, the output of the subtractor circuit 54 is connected to the negative input of a third comparator 55 and to the positive input of a fourth comparator 56. The positive input of the third comparator 55 is coupled to a third voltage reference 57 and the negative input of the fourth comparator is coupled to a fourth reference 58. The voltage references 57, 58 are used, for example, to define the thresholds of the above-mentioned range, as a function of the tolerance to noise and to the thermal drifts of the components for example, the passing out of the range, namely the presence of a case of garbling, being expressed by a high level at output of the comparators 55, 56. The results of the outputs of the comparators 55, 56 are grouped together by the connection of these outputs to the two inputs of a second OR logic gate 59. The output of this second OR logic gate 59 is connected to the input of a second memory 60. Like the first memory 50, the second memory 60 is validated by the signal QΣ so as to work only in the presence of received pulses. The second memory 60 is used to memorize the appearance of new high levels at output of the second OR gate 59, i.e. the appearance of garbling during the pulse. The presence of a high level at output of the memory 50 or memory 60, in a nonexclusive way, indicates the presence of a garbling of the pulse. The results at output of these memories 50, 60 are grouped together by the connection, for example, of these outputs to the two inputs of a third OR logic gate 61. The second detection means 55, 56, 57, 58, 59 may be formed by other circuits than those shown in FIG. 4. The use of the power limiters 41, 42 is optional, but is nevertheless recommended to prevent notably a saturation of the downline circuits.

What is claimed is:

1. A method to detect the garbling of pulses received by a secondary radar with monopulse reception antenna delivering a sum signal given by its sum channel and a difference signal given by its difference channel, wherein said method consists in analyzing the phase difference between the sum signal and the difference signal, the garbling of at least two received pulses being detected by means of a phase difference, the value of which is substantially different from 0° or 180°.

2. A method according to claim 1, wherein the garbling of at least two received pulses is furthermore detected by a substantially non-constant frequency variation between the sum signal and the difference signal.

3. A method according to claim 1 wherein, with at least one received signal having its azimuth included in the vicinity of the central axis of the reception antenna, the garbling of at least two received pulses is detected by a substantially non-constant frequency variation between the sum signal and the difference signal.

4. A method according to claim 3, wherein the reception of at least one signal having its azimuth in the vicinity of the central axis of the antenna is reported by a difference in power, between the sum signal and the difference signal, greater than a given threshold.

5. A method according to claim 1, wherein the sum signal and the difference signal are limited in power.

6. A device for the implementation of the method according to claim 1, comprising at least:
   one first power limiter, the input of which is connected to the sum signal and to one input of a power comparator;
   one second power limiter, the input of which is connected to the difference signal and to the other input of the power comparator;
   a mixer, the inputs of which are connected to the outputs of the power limiters and the output of which is connected to the input of first comparison means;
   an AND logic gate, one input of which is connected to the output of the first comparison means and the other input of which is connected to the output of the power comparator;
   a memory, the input of which is connected to the output of the AND logic gate and the control input of which is connected to a received pulse detection signal.

7. A device according to claim 6, wherein the first comparison means are constituted by two voltage comparators, two voltage references and an AND logic gate, the output of the mixer being connected to the negative input of a first comparator and to the positive input of a second comparator, the positive input of the first comparator being coupled to a first voltage reference and the negative input of the second comparator being coupled to a second reference, the outputs of the comparators being coupled to the two inputs of the AND logic gate.

8. A device according to claim 6, further comprising:
   one first frequency discriminator, the input of which is connected to the output of the first power limiter and the output of which is connected to the positive input of a subtractor circuit;
   secondary frequency discriminator, the input of which is connected to the output of the second power limiter and the output of which is connected to the negative input of the subtractor circuit;
   second comparison means, the input of which is connected to the output of the subtractor circuit and the output of which is connected to the input of a second memory, the control input of the second memory being connected to the received pulse detection circuit;
   an OR logic gate, the inputs of which are connected to the outputs of the memories.

9. A device according to claim 8, wherein the second comparison means are constituted by two voltage comparators, two voltage references and an OR logic gate, the output of the subtractor circuit being connected to the negative input of a third comparator and to the positive input of a fourth comparator, the positive input of the third comparator being coupled to a third reference and the negative input of the fourth comparator being coupled to a fourth reference, the outputs of the comparators being connected to the two input of the OR logic gate.

* * * * *